April 20, 1954

J. W. WARD 2,675,663

BEAN PICKER

Filed Aug. 14, 1950

INVENTOR.
JOHN WILLIAM WARD
BY Theodore E. Simonton
Attorney.

INVENTOR.
JOHN WILLIAM WARD
BY Theodore E. Simonton
Attorney.

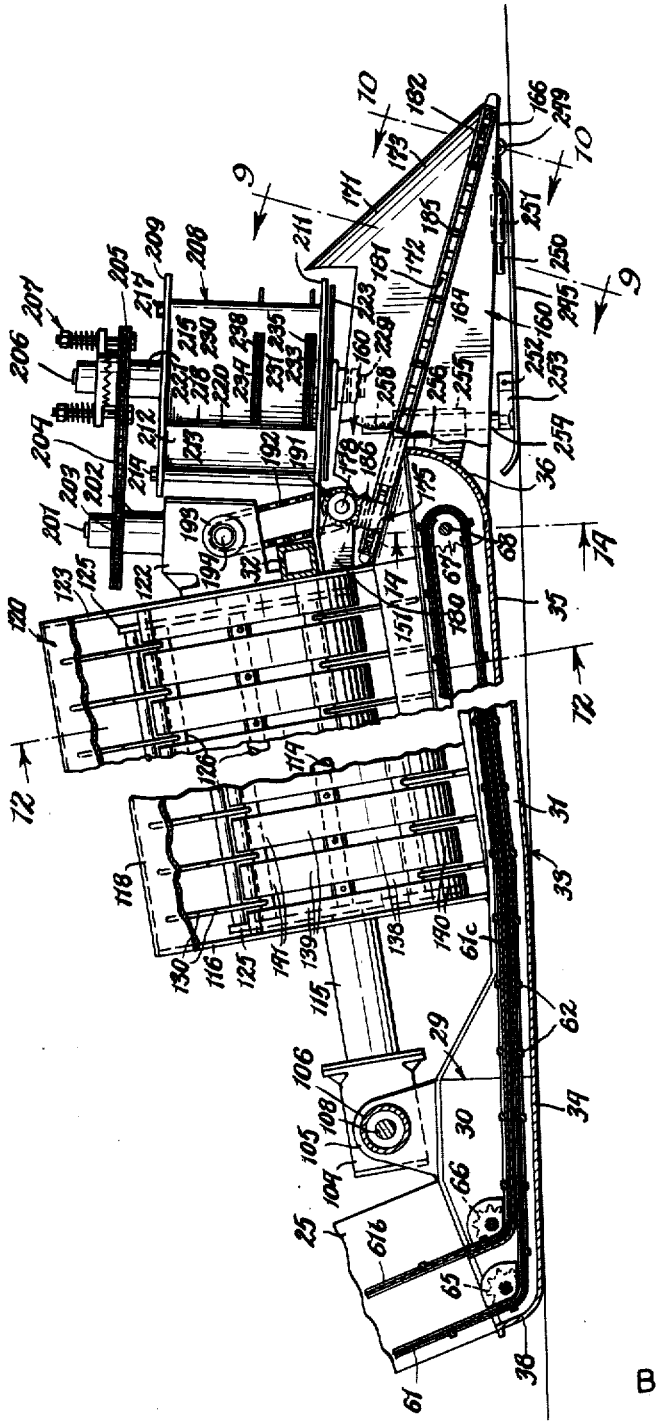

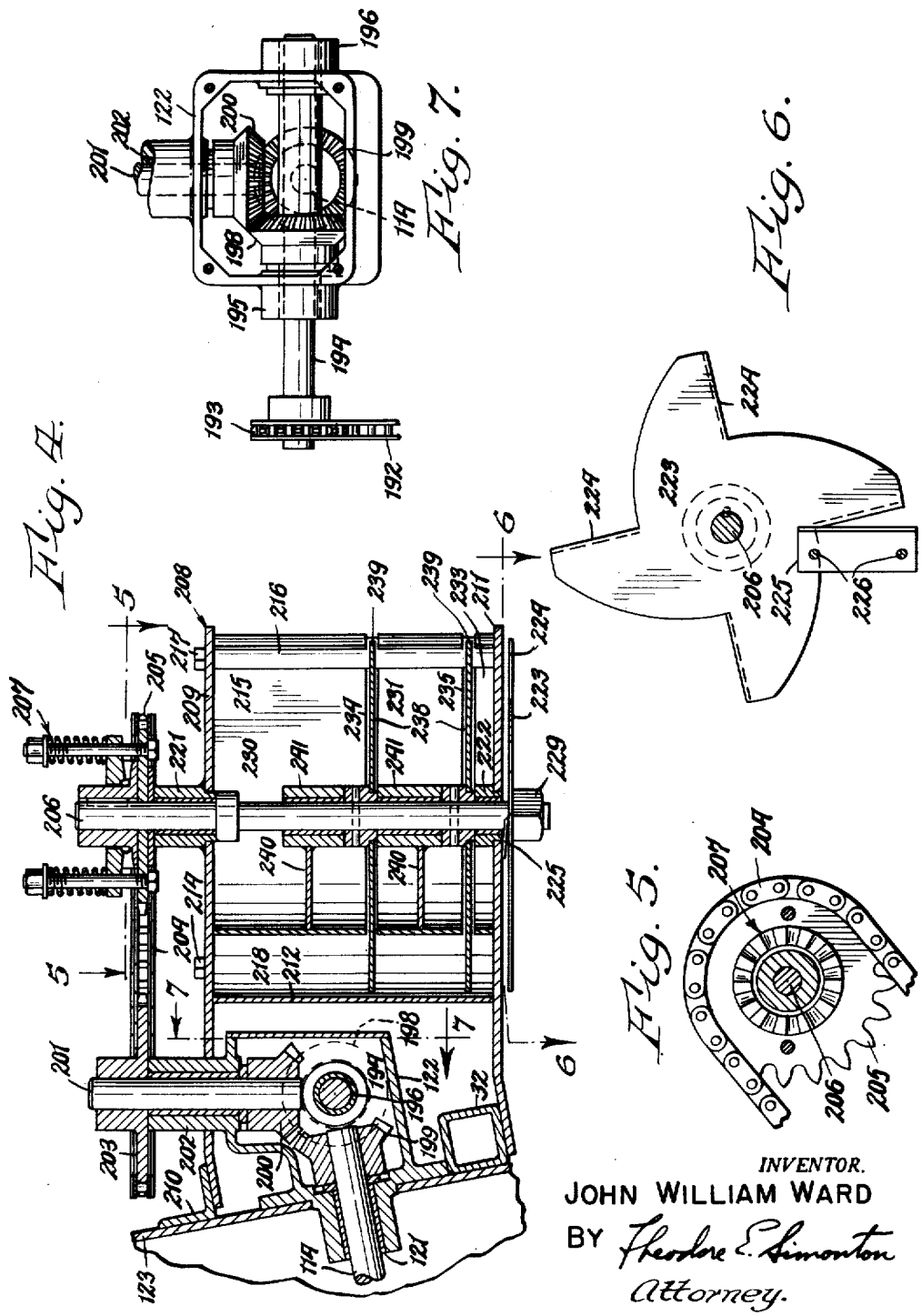

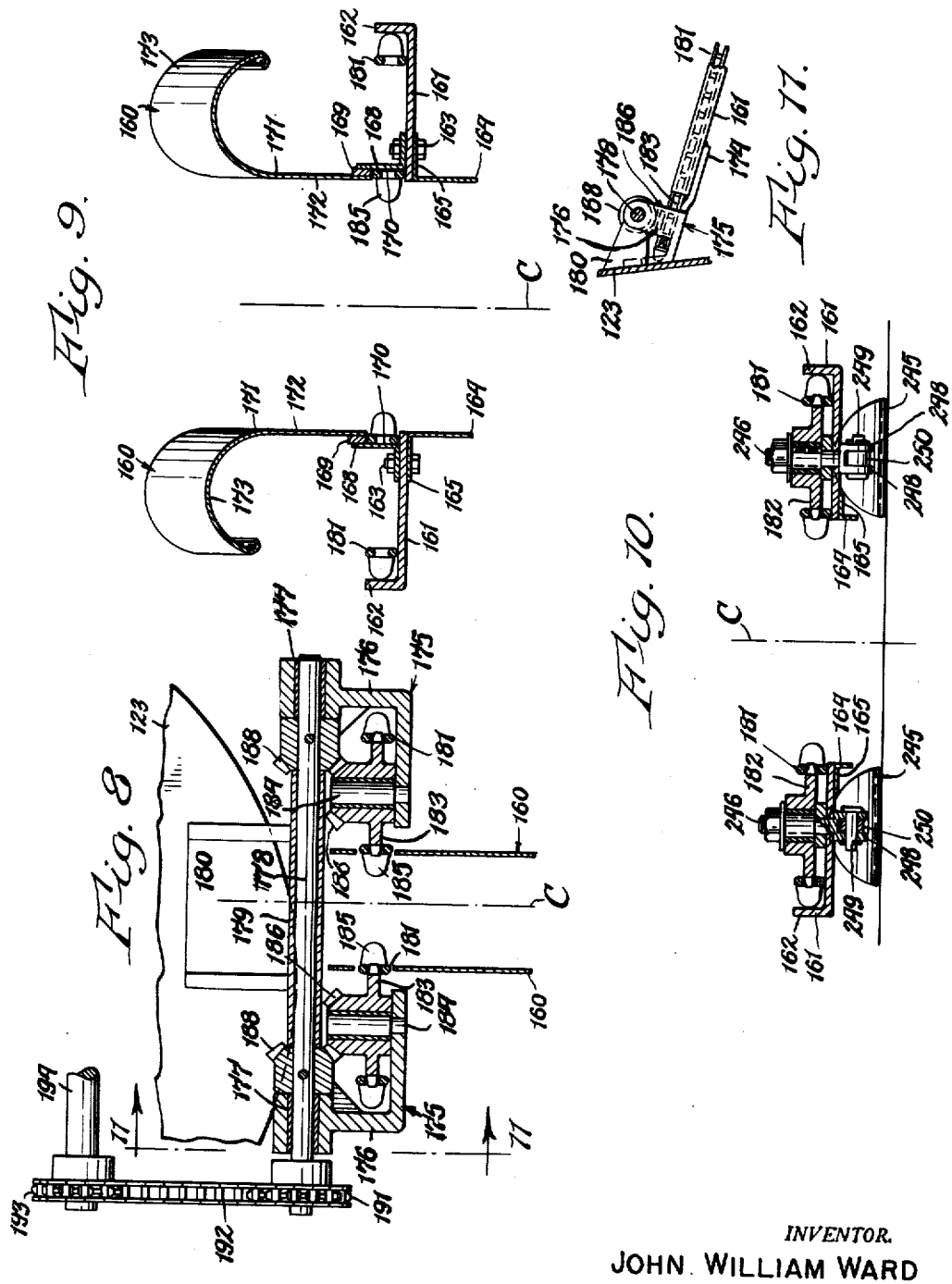

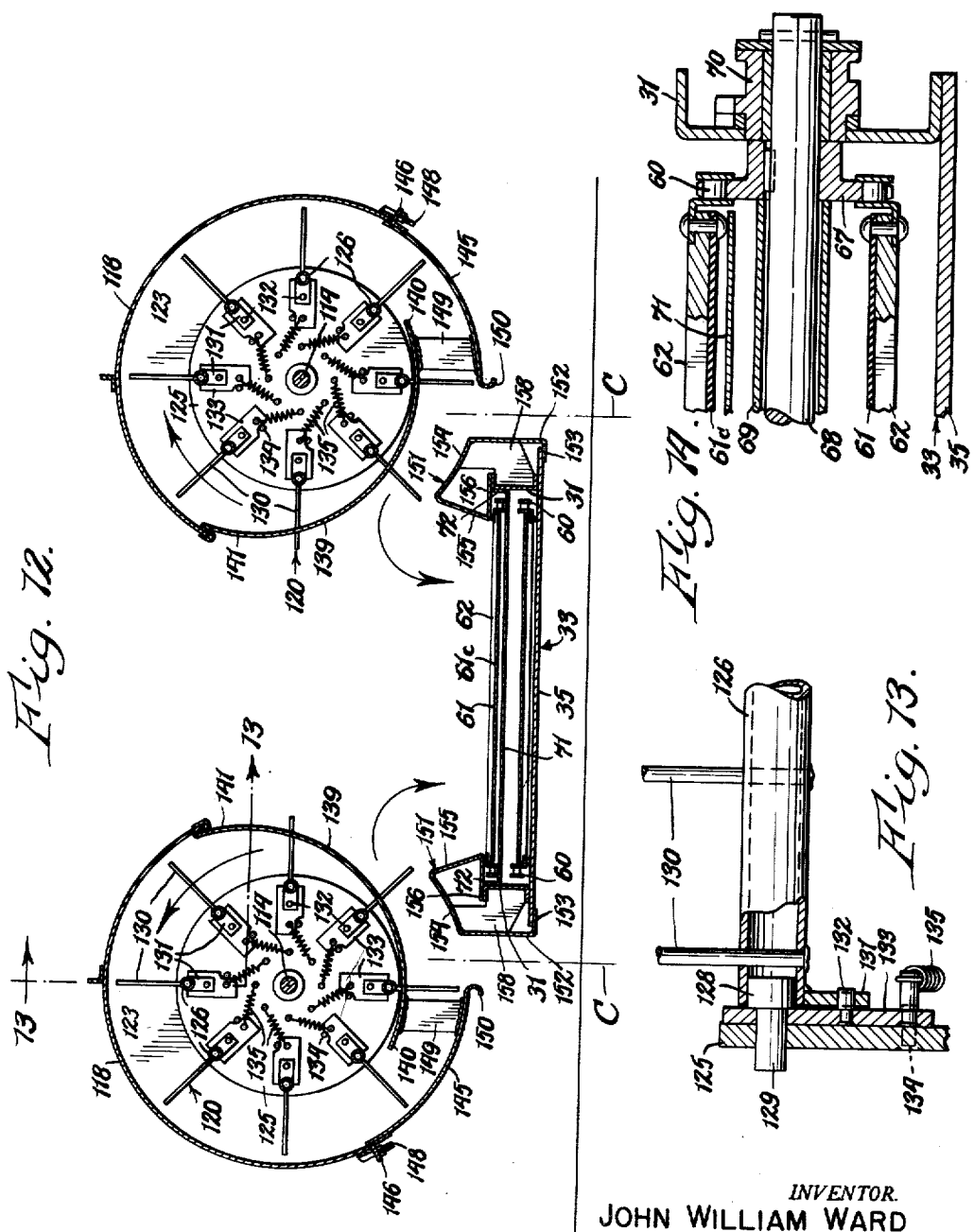

Patented Apr. 20, 1954

2,675,663

UNITED STATES PATENT OFFICE 2,675,663

BEAN PICKER

John William Ward, Vernon, N. Y., assignor to Ward Canning Company, Vernon, N. Y., a partnership Application August 14, 1950, Serial No. 179,145

19 Claims. (Cl. 56—130)

This invention relates to a bean picker, and relates more particularly to a harvester for picking whole bean pods of green or wax beans of the string bean or stringless bean varieties, commonly called snap beans, direct from bean plants growing in the field without uprooting or seriously injuring the plants.

The bean picker of the present invention is an improvement upon the bean pickers disclosed in Leila B. S. Ward application Serial No. 7,830, filed February 12, 1948, now Patent No. 2,587,553 issued February 26, 1952. In the machines of that prior application, the bean pod picking principle employed consists in providing longitudinally spaced tines that successively engage each bean plant as a result of the forward movement of the machine, that are moved upward within the bean plant to pass between the pods and the main portion of the plant to snap the pods off the plant at their stems, and that initially engage the bean plants at different points along the plant to subject the plant to a progressive raking or combing action. The same bean picking principle is disclosed in Esch Patent 2,466,089, issued April 5, 1949.

In one modification of said application Serial No. 7,830, now Patent No. 2,587,553, this picking principle is carried out by rows of tines spaced along a rotating picking drum or reel, the drum being disposed alongside and longitudinally of the row of bean plants and being inclined upward and forward with respect to the travel of the machine along the row, so that the bean plants are picked progressively from the top down. In the machine of the present application, I have utilized this same picking principle and employ a similar drum improved in details, but I have also added various other features that improve the operation of the machine and enhance its utility.

My present bean picker includes a mold board cooperating with the picking drum in such manner that the bean plants are laid over on their sides laterally of the row while being subjected to the action of the tines. By so doing, the severed pods are tossed transversely of the machine, or, in the two-row bean picker constituting the preferred embodiment of my invention, are tossed toward a conveyor located along the central longitudinal axis of the machine, thus facilitating the collection of the pods. This mold board is so constructed that it acts as a fulcrum that travels down along the bean plant, so that the plant is bent and frictionally held at a progressively descending point which is always close to the picking point. This action serves to hold the bean plants against uprooting. The progressive bending also avoids injury to the main stem of the plant, for a purpose that will presently appear.

My bean picker, in its preferred form, also includes improved, positively driven means for raising the bean plants to an erect position, and means for cutting off the leafy tops of the erect bean plants and depositing them in a windrow between the rows of bean plants, both of these means being located at the front of the machine in advance of the picking mechanism proper. The erecting means cooperate with the topping means to assure that the plants are cut off at a uniform heighth.

This topping operation performs several functions. The top of the bean plant is usually heavily leafed, and contains no bean pods. The topping reduces interference with the central tossing of the pods during picking, and results in a higher recovery of the severed pods. The topping also reduces the undesirable severing of leaves by the picking tines, thus facilitating the later air-blast separation of the bean pods from leaves and trash. Further, the topping cuts off tall weeds that might interfere with the picking and recovery of the bean pods. Curiously enough, the topping also aids in obtaining a second crop of bean pods from the same plants. The combined effect of topping and picking appears to stimulate further growth of the plants, probably by keeping the plants in proper balance for continued production of pods, and by reducing weed competition, as the cut-off weeds mostly die. Also, the windrow of tops and weeds left between the rows of bean plants, serves as a mulch with all of the well-known virtues of a mulch in promoting plant growth. Moreover, the topping makes the bean plants shorter and hence easier to pick a second time by my machine. The progressive bending described above, by avoiding injury to the plant, cooperates with the topping to make this second growth possible.

Certain types of bean plants under certain climatic conditions, particularly frequent high winds, tend to lose their top leaves before the plants are ready for a first picking. Under these conditions, the topping operation may be eliminated, by either disabling or omitting the topping mechanism, unless it is desirable to cut off tall weeds. Also, with certain bean plants of a particularly erect habit of growth, stationary gathering aprons may be employed for raising the bean plants, and my positively driven erecting means may be omitted. Also, instead of a picking drum, other means for supporting and moving the picking tines could be employed in connection with the other improvements of my invention. These features are therefore not of the essence of my invention, although they are valuable features of the preferred form thereof.

In general, the harvester shown in the accompanying drawings comprises a body secured to a tractor, and a frame and in part formed by a tractor, and a frame adjustably supported by the body so that its front and rear ends may be independently elevated to levels to suit the condition of the bean plants being operated upon. The frame carries, at its forward end, two pairs of stationary gathering aprons, each pair aligning with a row of bean plants and being formed so as to lift the drooping or sprawling branches of the bean plant and bring the plants to an erect position. In this, the gathering aprons are assisted by gathering chains which travel along the face of each apron engaging the bean plants. While still held by the aprons, the bean plants of each row are topped by a rotary cutter and the tops are discharged to a windrow between the two rows of plants being picked. On leaving the gathering aprons, the bean plants of each row pass alongside a mold board over which they are bent by a picking drum provided with radially projecting picking tines. The picking tines throw the severed pods and leaves centrally onto a common, endless belt conveyor. This conveyor carries the pods and leaves to an elevated station at the rear of the harvester, where the material is subjected to a blast of air which winnows the leaves and trash from the bean pods and deposits the leaves and trash between the rows at the rear of the harvester. The bean pods fall to a bagger where they are placed in bags.

The principal object of the present invention is to provide a snap bean harvester that possesses the above described advantages.

Another object of the invention is to provide a snap bean harvester that picks the maximum quantity of beans from the plants regardless of the degree of maturity of the beans, the size or condition of the plants or the type of beans being picked, and without uprooting or seriously injuring the plants, leaving them in condition to bear a second crop if desired.

Another object of the invention is to provide such a bean picker that operates with a minimum of injury to the beans, particularly to the tender pods which command the highest market value.

Another object of the invention is to provide such a harvester which is rapid in its action, so that the beans can be picked quickly and with a minimum of effort on the part of the operators.

Another object of the invention is to provide such a bean picker that does not require a high degree of skill to operate, particularly in following the rows of beans.

Another object is to provide such a bean picker that is rugged in construction and not subject to breakdown or other interference with its operation, particularly from stones, it being well-known that good bean fields are often very stony.

Another object of the invention is to provide improved gathering aprons and gathering chains for bringing the sprawling branches of the bean plants to an erect position for further processing.

Another object of the invention is to simplify the construction of a two-row bean picker by using a common, endless conveyor for receiving the pods severed from both rows of plants by two picking mechanisms, one operating on each row.

Another object is to provide a picking mechanism in which the picking tines are automatically freed from clinging branches and trash as they rotate.

Another object of the invention is to insure against injury to the picking tines by providing a yielding support that permits these tines to yield when they encounter excessive resistance.

Other objects and advantages of the invention will be apparent from the following description and drawings, in which:

Figure 1 is a side elevation of a bean harvester embodying the present invention and showing the same applied to a conventional farm tractor which is shown in dot-dash lines;

Figure 3 is an enlarged vertical longitudinal section of the device taken generally along line 3—3, Figure 2, and showing a part of the mechanism broken away;

Figure 4 is a vertical section on an enlarged scale, taken generally along line 4—4, Figure 2;

Figure 5 is a fragmentary horizontal section taken along line 5—5, Figure 4;

Figure 6 is a horizontal section taken generally along line 6—6, Figure 4, and showing the topping blades;

Figure 7 is a detail section taken generally along line 7—7, Figure 4;

Figure 8 is an enlarged vertical section taken generally along line 8—8, Figure 1, and showing the drive to the gathering chains;

Figure 9 is an enlarged vertical section taken generally along line 9—9, Figure 3, and showing the gathering apron and chains in section;

Figure 10 is an enlarged vertical section taken along line 10—10, Figure 3, and showing the foremost sprocket wheels for the gathering chains and also the skids at the forward end of each gathering apron;

Figure 11 is a diminutive vertical section taken on line 11—11, Figure 8;

Figure 12 is a vertical section of the device taken along line 12—12, Figure 3, and showing the bean picker reels and endless belt conveyor in section;

Figure 13 is an enlarged vertical section, with parts broken away, taken along line 13—13, Figure 12, and showing a detail of the yielding support for the picking tines; and Figure 14 is an enlarged vertical section taken along line 14—14, Figure 3, and showing, in section, the sprocket for the forward end of the endless belt conveyor.

Figure 2:
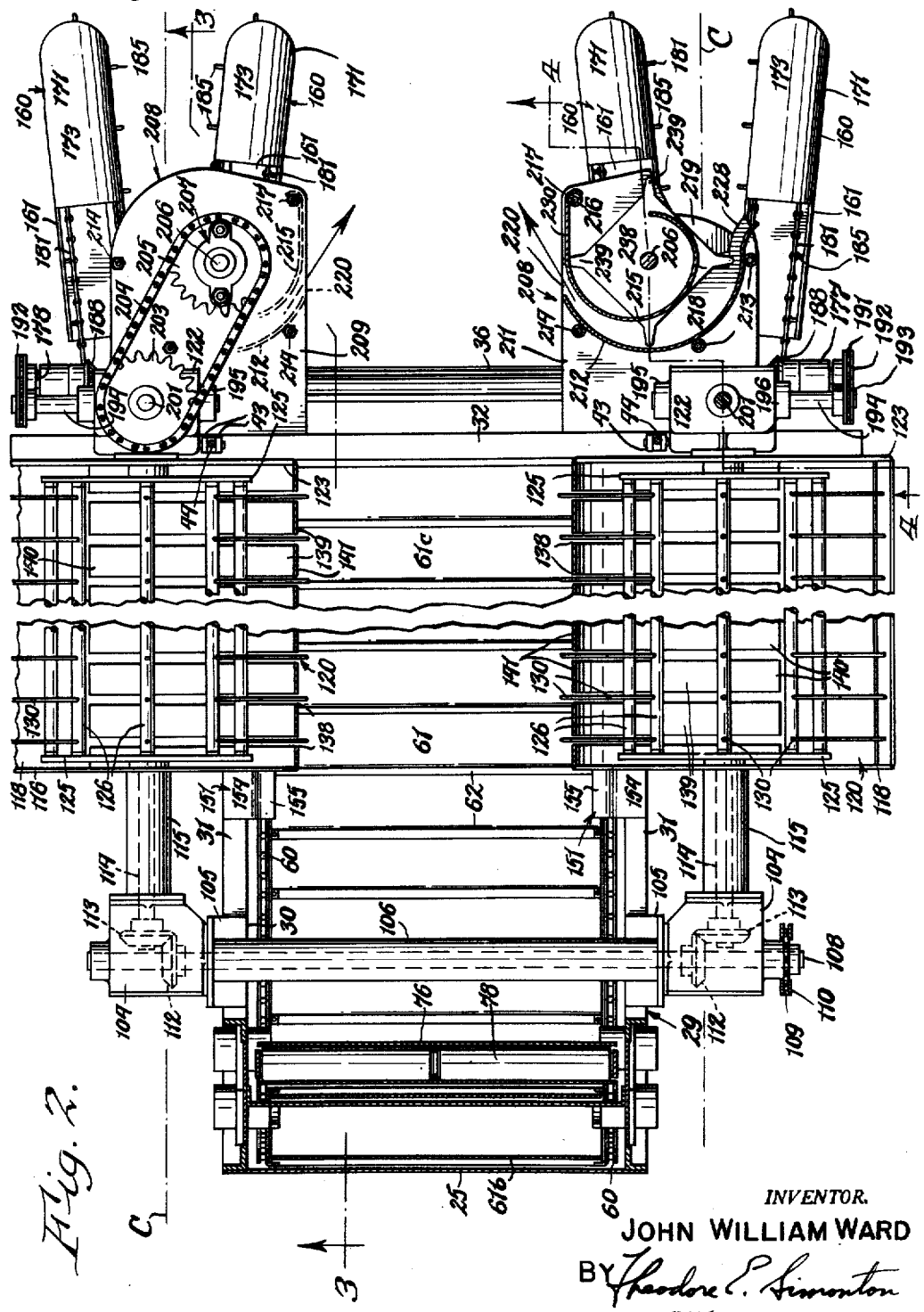
Figure 2 is an enlarged horizontal fragmentary section taken generally on line 2—2, Figure 1, with parts broken away, and also showing the gathering and topping mechanism in the upper right hand part of this view in plan and showing the corresponding mechanism in the lower right hand part of this view in section.

For convenience in understanding the invention, the centerlines of the rows of bean plants (not shown) to be harvested are designated by the letter C.

The bean harvester is propelled along two rows of bean plants by a conventional farm tractor T shown by dot-dash lines in Figure 1. This tractor is shown as having the conventional frame F, rear driving wheels W, front steering wheels w, motor M and seat S. Particularly associated with the present invention are two manual hydraulic control levers L and L' which control, respectively, the movement of two pairs of lifting arms 13 and 14, the members of each pair being located at opposite sides of the tractor. Each pair of arms is fast to a corresponding cross shaft 15 or 16, which is journalled in tractor frame F and rotated by the hydraulic control. The upper free end of each lifting arm 13 is apertured to connect with a lifting chain and the upper free end of each lifting arm 14 is apertured to connect with a lifting push rod as hereinafter described. Also particularly associated with the present invention is a power take-off 17 secured to the tractor frame F by suitable brackets and carrying and driving a transverse drive shaft 18 from which power for operation of the harvester is derived.

At each side of the tractor a lifting bell crank lever 19 is mounted on the housing for the power-take off 17 concentric with its shaft 18, one arm 20 of each bell crank lever projecting upwardly and being apertured to receive an intermediate part of a pull chain 21, one end of which is connected to the upper free end of the corresponding hydraulically-operated lifting arm 13 and the other end of which is secured through a helical tension spring 22 to a bracket 23 secured to the corresponding side of the frame F of the tractor.

Each bell crank lever 19 has a second arm 24 projecting rearwardly, and the free ends of these arms 24 are pivotally secured to the opposite sides of an elevator housing 25 concentric with a transverse jack shaft 26 journalled in this housing. This jack shaft 26 is driven from the power take-off shaft 18 by a chain and sprocket drive 27, 28, and the other powered components of the bean harvester are driven from this jack shaft as hereinafter described.

The elevator housing 25 forms a part of the adjustable frame of the harvester and is rectangular in cross section and open at its top and bottom to receive and enclose the upwardly extending stretch of an endless belt conveyor. The lower end of this housing 25 is fast to a base 29, the vertical side walls 30 of which are fast to channels 31 which project forward from these side walls 30 and are arranged on opposite sides of the tractor. These channels 31 form the main longitudinal side frame bars or back bone of the adjustable frame of the harvester. As shown in Figures 2, 3 and 4, the front ends of the channels 31 are rigidly connected by a bar 32 which is preferably tubular and square in cross section, and which forms the front cross bar of the harvester frame. The channels or side frame bars 31 are also connected by a metal bottom plate 33, which, as best shown in Figure 12, is secured to the under sides of the side bars 31 and projects laterally a short distance therefrom. This bottom plate 33 travels close to the ground, its rear end 34, as best shown in Figure 3, being arranged substantially parallel with the ground while its forward end 35 inclines forwardly and upwardly at a slight angle. As also shown in Figure 3, the extreme forward end 36 of the bottom plate 33 curves upwardly to provide a scow-like prow, and the rear end 34 thereof extends under the base 29 of the elevator housing 25 and curves upwardly, as indicated at 38, to join the rear wall of the housing.

As best shown in Figure 2, the tubular cross bar 32 is provided near its opposite ends with a pair of upstanding ears 43, to which is pivotally connected the lower end of a lifting link 44. As best shown in Figure 1, the upper end of each of the links 44 connects with a triangular plate 45 which forms in effect another bell crank lever which is pivoted at 46 to a bracket 48 secured to the tractor frame F. The third or upper pivot 49 of each triangular plate 45 is connected by a push rod or link 50 with the free end of the hydraulically actuated lifting arm 14. The pivot 49 also connects with a helical tension spring 51, the forward end of which is anchored to a bracket 52 carried by the frame F of the tractor.

The hand lever L hydraulically controls the arms 13, and it will be seen that when these arms 13 are actuated to rotate clockwise, as viewed in Figure 1, tension is imposed on the chains 21 to rotate the bell crank levers 19 clockwise and lift their lower arms 24. Since each lower arm 24 is pivotally connected with the rear end of the frame of the harvester, this serves to lift the rear end of the harvester to an elevation to suit the condition of the bean plants being picked. At the same time, since the drive chain 27 passes around sprockets concentric with the shafts 18 and 26 supporting and supported by, respectively, the two bell crank levers 19, the power drive from the tractor T to the harvester is not interferred with by such adjustment of the rear end of the harvester frame. The hand lever L' hydraulically controls the arms 14, and it will be seen that clockwise rotation of the arms 14, as viewed in Figure 1, pushes on the rods 50 to rotate the triangular plates 45 clockwise about their pivots 46, thereby lifting the rods 44 which support the front tubular cross bar 32 of the harvester frame, the front end of the harvester being thereby elevated to suit the condition of the bean plants being picked. It will also be noted that each pair of helical tension springs 22 and 51 serve to yieldingly support the corresponding ends of the harvester frame.

The elevator, winnowing and bagging mechanism at the rear of the harvester are not a part of the present invention and hence are not illustrated in detail. As certain drive elements of the claimed structure are common to the elevator mechanism, these drive elements are generally illustrative in Figure 1, which shows a top casing section 55 mounted on the upper open end of the elevator housing 25 and having an open rear end near which a transverse horizontal shaft 56 is journalled. This shaft 56 is fast to a sprocket 57 connected by a chain 58 with a sprocket 59 on the jack shaft 26. This shaft 56 carries, within the top casing section 55, a pair of sprockets (not shown), each of which supports and drives a drive chain 60 fast to each edge of the endless belt conveyor 61, which is preferably made of rubberized cloth and, as best shown in Figure 2, is provided on its working face with a succession of transverse slats 62. The drive chains 60 along the opposite edges of the conveyor 61 can be of any suitable form and are preferably secured to the opposite ends of the slats 62 in any suitable manner, such as by the rivets shown in Figure 14. This conveyor 61 receives the severed bean pods, as well as some leaves and stems that are removed from the bean plants, elevates the pods and this trash through the elevator housing 25, and discharges the same through the open rear end of the top casing section 55 of the elevator. For this purpose, the drive chains 60 of the conveyor 61 pass around two pairs of idler sprockets 63 and 64

(Figure 1) journalled in the top casing section 55 of the elevator, and also around two pairs of idler sprockets 65 and 66 journalled in the base 29 of the elevator housing 25. These idler sprockets 63—66 are spaced to provide an upper horizontal discharge stretch 61a of the conveyor 61 discharging through the open rear end of the top casing section 55 of the elevator, and an inclined, but generally vertical, stretch 61b in the elevator housing 25.

The patch of travel of the conveyor 61 is completed by a pair of idler sprockets 67 located alongside the inner or opposing faces of the frame side bars or channels 31 immediately in rear of the upturned prow 36 of the bottom plate 33. These sprockets 67 provide a generally horizontal stretch 61c of the conveyor 61 which, as best shown in Figures 3 and 12, extends transversely between the side bars 31 and travels parallel with the bottom plate 33 from the front 36 to the rear 38 thereof. The pair of sprockets 67 can be supported in the manner shown in Figure 14, where they are shown as keyed to a cross shaft 68 and held in spaced relation by a spacer tube 69. The shaft 68 is shown as journalled in bearings 70 secured to the forward ends of the side bars 31. To prevent sagging of the upper part of the stretch 61c of the conveyor 61, it and the corresponding parts of the drive chains 60 can be supported by a sheet metal pan 71 having upturned edges 72 secured to the frame side bars 31, as best shown in Figure 12.

As best shown in Figure 1, the pods and trash are supported for upward movement along the generally vertical elevator stretch 61b of the conveyor 61 by an endless idler belt 76, the lower end of which passes around a transverse idler roller 78 journalled in the lower end of the elevator housing 25 and the upper end of which passes around a transverse idler roller 79 journalled on the top section 55 of the elevator. The rear stretch of this idler belt 76 is in parallel, face-to-face, spaced relation to the corresponding stretch 61b of the conveyor 61, so that bean pods and trash entering the space between these stretches are held in engagement with these stretches and conveyed upwardly to the upper horizontal discharge stretch 61a of the conveyor 61.

The pods and trash discharged by this upper horizontal discharge stretch 61a of the conveyor are subjected to a blast of air from the discharge 90 of a blower 91. A pulley 92 is fast to the shaft 93 of this blower and is connected by a belt 94 with a pulley 95 on the jack shaft 26. The blower is supported by a bracket 98 secured to the elevator housing 25.

The blast of air delivered by the blower 91 separates the leaves and other trash from the heavier bean pods, and blows the trash through a downwardly directed discharge hood 99. The pods fall into a bagging mechanism 100 of any suitable construction, which delivers the pods to one or more bags indicated by the dot-dash line 101, Figure 1. Also as shown in this figure, a stationary platform 102 can project rearwardly from the frame of the harvester to carry an operator, other than the driver, who throws off the filled bags 101 and replaces them with empty bags as the harvesting proceeds.

As best shown in Figures 2 and 3, a gear case 104 is mounted on each sidewall 30 of the base section 29 of the elevator by brackets 105, these brackets being connected by a cross tube 106. These gear cases journal a cross shaft 108 having a sprocket 109 fast to one projecting end.

The sprocket 109 is connected by a chain 110, as shown in Figure 1, with a sprocket 111 fast to the corresponding end of the jack shaft 26.

Within each gear case 104, the cross shaft 108 carries a bevel gear 112 which meshes with a bevel gear 113 fast to a longitudinal picker shaft 114. As best shown in Figure 3, the picker shafts 114 are arranged outside of and above and generally parallel with the side bars 31 of the harvester frame. The rear ends of the picker shafts 114 extend through tubes 115, each of which is secured to the corresponding gear case 104 and, as best shown in Figures 2 and 3, supports the rear end plate 116 of a semi-cylindrical cover or enclosure 118 of a rotary picking mechanism, indicated generally at 120, carried by the corresponding picker shaft 114.

The forward end of each of the picker shafts 114 is journalled, as best shown in Figure 4, in the bearing 121 of a gear case 122. Each of these gear cases is secured to the front end plate 123 of the semicylindrical cover or enclosure 118 of the corresponding picking mechanism 120, and this front end plate 123 is in turn secured to the tubular front cross bar 32 of the harvester frame.

Each of the rotary picking mechanisms 120 operates on a single row of bean plants, and is provided with rod-like picking tines which enter the bean plants, sever the bean pods therefrom, and deposit the pods on the lower horizontal stretch 61c of the conveyor 61. To this end, as best shown in Figures 2 and 11, a pair of large end disks 125 are fast to each of the picker shafts 114 within the semicylindrical enclosure 118 and adjacent the corresponding end plates 116 and 123 of the enclosure. The pair of disks 125 on each picker shaft carries an annular series of rods 126 arranged adjacent the margins of these disks and equidistant from and parallel with the axis of rotation of the corresponding picker shaft 114. It will be seen that the end disks 125 and rods 126 provide picking reels or drums at each side of the machine. Each of these rods 126 is journalled at its ends on the companion pair of disks 125 and to this end, as best shown in Figure 13, is preferably tubular and has each of its ends pivotally mounted on the head 128 of a pin 129 extending through the corresponding disk 125.

Each of the rods 126 is provided with a row of rod-like picking tines or fingers 130 extending therethrough and projecting radially in the same direction from one side thereof. The tines 130 are yieldingly held in operative position in which they project radially relative to the corresponding picker shaft 114, and to this end one or both ends of each rod 126 can be provided with an arm 131 which projects in the opposite direction from the corresponding picking tines 130 and is secured by a pin 132 to an arm 133 which is journalled on the shank of the corresponding pin 129 and functions as an enlargement or extension of the arm 131. This last arm 133 is yieldingly held against a stop pin 134 projecting from the face of the corresponding end disk 125 by a helical tension spring 135. These stop pins 134 and springs 135 are so arranged that with the picking mechanism 120 rotating in the directions indicated by the arrows in Figure 12, if an obstruction is encountered by the picking tines 130, these tines will rotate the tubular rods 126 against the resistance of the springs 135 and pass the obstruction.

The picking tines 130 enter the bean plants from the outsides of the two rows being harvested, and travel upwardly to strip the beans therefrom and to deposit them on the horizontal stretch 61c of the conveyor 61. To clear the tines 130 of any clinging debris as they leave the plants, and also to hold the plants in a bent-over position while the picking tines 130 are acting on them and thereby avoid uprooting of the plants, the picking tines 130 work through slots 138 between arcuate slats or bars 139, which together form a comb-like grill. The lower ends 140 of the slats 139 are free and register with the radially inner ends or bases of the picking tines 130, while the upper ends 141 of these slats are secured to the inner upper edge of the cover 118, this edge being located at about the two o'clock position as viewed at the left of Figure 12 and at about the ten o'clock position as viewed at the right of Figure 12. It will therefore be seen that the slats or bars 139 of each comb-like grill are in spiral relation to the axis of rotation of the corresponding picking mechanism, the picking tines 130 entering the slots 138 at the bottom of each picking mechanism 120 between the free ends 140 of these slats and withdrawing from these slots 138 slightly above a horizontal plane intersecting the axis of the picker shaft 114. Since the picking tines 130 perform their work while traveling from their downwardly projecting vertical position to a subsequent position short of horizontal, it will be seen that the withdrawal of the picking tines 130 from the slots 138 serves to clear them by combing off any leaves, stalks or other trash clinging to these tines.

Each semicylindrical cover 118 is completed, on the outside of the harvester, to a vertical plane intersecting the axis of the corresponding picker shaft 114, by an arcuate housing plate 145, confirming to the curvature of the cover 118 and engaging the stationary end heads or disks 116, 123. An angle bar 146 is welded to the upper edge of housing plate 145, and, as best shown in Figure 12, this angle bar is secured to stud bolts 148 projecting from the lower edge of the semicylindrical cover 118. To support the lower extremity of this housing plate 145 and also to hold each of the slats 139 of the comb-like grill in alignment with the spaces between the picking tines 130, a vertical plate 149 is welded centrally to the lower extremity of each slat 139 and projects downwardly therefrom and is welded to the top face of the lower extremity of the housing plate 145. The lower edge of each housing plate 145 is also preferably rolled to provide a rounded edge 150 along which the bean plants freely slide as the harvester moves along the rows of plants.

A principal feature of the invention resides in the provision of means for holding the bean plants bent over while being acted upon by the picking tines 130. To this end, the opposing sides of the two rows of bean plants being harvested are held against and travel along a horizontally elongated abutment or mold board 151 secured to each of the frame side bars 31 along the picking zone. Each of the mold boards 151, as best shown in Figure 12, has a vertical wall 152 arranged in spaced relation to the rolled lower edge 150 of the lower housing section 145 to permit the bean plants to pass therebetween. The vertical wall 152 terminates in a bottom inturned longitudinal flange 153 which is secured at intervals to the underside of the bottom plate 33 at the side edge thereof. The upper edge of the vertical wall 152 terminates in an arcuate concave wall 154 which forms a continuation of this vertical wall and extends inwardly therefrom in concentric relation with the picker shaft 114. The ends of the picking tines 130 sweep in close relation to these concave parts 154 of the mold boards 151. The upper edge of each arcuate wall 154 terminates in a downwardly and inwardly inclined wall 155 which forms a continuation thereof and which extends over and houses the corresponding side chain 60 of the conveyor 61. The lower edge of each of these inclined walls 155 terminates in a flange 156 which rests on and is secured to the corresponding side bar 131 of the harvester frame. At intervals the mold boards 151 can be reinforced by internal transverse plates 158 welded at their tops and outer sides to the arcuate and vertical walls 154 and 152, respectively, and fitting in the channels of the side bars 31.

The mold boards 151 are not of uniform size in cross section, but diminish toward the rear of the harvester to conform to the upward and forward inclination of the picker shafts 114 and the picking mechanisms 120 carried thereby.

The bean plants of each row are gathered at each side of the harvester by a pair of gathering aprons indicated generally at 160. As best shown in Figures 9 and 11, each gathering apron 160 comprises a bar 161 which is L-shaped in cross section, having an upstanding guide flange 162 along its edge remote from the row of beans. Bolted, as at 163, to the underside of this bar along the edge thereof adjacent the row of bean plants is a lower apron 164, this lower apron having an upper attaching flange 165 through which bolts 163 extend. The lower apron 164 is in the form of a vertical flat plate that diminishes in height toward its front end to form a forward pointed end 166, as best shown in Figure 3.

Secured by the same bolts 163 to the bar 161 is an angle bar 168 to the upper part of which, on the side facing the bean plants, is secured a spacing strip 169 to form a guideway 170 extending longitudinally of the bar 161. Secured to the inner face of the spacing strip 169 is an upper apron 171 which has a planar vertical part 172 extending upwardly from the spacing strip 169 and an upper outwardly curving edge 173 which supports the branches of the bean plants. As best shown in Figures 1 and 3, this curving edge 173 extends abruptly upwardly and rearwardly from the pointed forward extremity 166 of the gathering apron, this upper curving edge thereby serving to elevate the sprawling branches of the bean plants and bring the bean plants to an erect position.

As best shown in Figure 11, the rear end of each of the bars 161 rests on and is suitably secured to the forwardly extending tongue or extension 174 of a supporting bracket 175. As best shown in Figure 8, the bracket 175 is L-shaped in cross section, having a base flange forming a continuation of the bar 161 and an upstanding flange 176 on the side thereof remote from the bean plants. The upstanding flange 176 of each bracket 175 has a bearing 177 journalled on a corresponding cross shaft 178. Each cross shaft 178 is in turn journalled in a bearing 179 of a bracket 180 attached to the front face of the front stationary disk 123 of the housing for the corresponding picking mechanism. It will therefore be seen that the gathering aprons 160 of each pair are pivotally mounted at their rear ends on the cross shaft 178 so that their front ends are free to rise and fall. The space between the pair of gathering aprons 160 at each side of the machine aligns, of course, with the space between the corresponding mold board 151 and the rolled lower edge 150 of the housing plate 145 for the corresponding picking mechanism 120, so that the bean plants gathered by the gathering aprons 160 are led with their branches raised into the spaces between the mold boards 151 and rolled edges 150.

The lifting of the branches of the bean plants between each pair of gathering aprons is facilitated by chains 181, the bean plant engaging stretch of each of which passes along the guideways 170 formed by the spacer bars 169, and the other stretch of which rides on the L-shaped bar 161 adjacent the upstanding flange 162 thereof. At its lower end each of these chains 181 passes around an idler sprocket 182 mounted on the lower end of the corresponding bar 161, while the upper end of each of these chains passes around a drive sprocket 183 journalled on an upstanding pin 184 on the base flange of the bracket 175. Each gathering chain is preferably provided with suitable knobs 185 to insure gathering of the branches of the bean plants.

As best shown in Figure 8, each sprocket 183 is formed integrally with a miter gear 186 which meshes with a miter gear 188 fast to the cross shaft 178 which serves the pair of chains 181 at each side of the harvester. A sprocket 191 is fast to the outer end of each cross shaft 178, this being connected by a drive chain 192 with a sprocket 193 fast to the outer end of a cross shaft 194. As best shown in Figure 7, each of the cross shafts 194 is journalled in a pair of aligning bearings 195, 196 of the corresponding gear box 122. Inside of each gear box 122, a miter gear 198 is fast to the cross shaft 194 and meshes with a miter gear 199 fast to the end of the corresponding picker shaft 114.

A feature of the invention resides in the provision of mechanism for topping the bean plants prior to picking. To this end, within each gear box 122 is arranged a third miter gear 200 which, as best shown in Figures 4 and 7, meshes with the miter gear 198 and is fast to a vertical shaft 201 journalled in a bearing 202 in the top of the gear box 122 and projecting upwardly therefrom. At its upper end this vertical shaft 201 carries a sprocket 203 connected by a chain 204 with a sprocket 205 loosely mounted on a vertical shaft 206. This sprocket 205 is drivingly connected to the shaft 206 by a ratchet clutch 207 which is of conventional construction and hence is not described in detail.

Each of the shafts 206 is journalled in a casing 208 and which is shown as comprising a horizontal top plate 209 secured along its rear edge to the underside of an angle bar 210, this angle bar, in turn, being secured to the front face of the front end plate 123 of the picking mechanism 120. Each casing 208 also includes a horizontal bottom plate 211, which is secured at its rear edge to the underside of the tubular cross bar 32 of the harvester frame. The casing 208 also has a semicylindrical rear wall 212 which is interposed between the top and bottom plates 209, 211, and has vertical sleeves 213 welded thereto and through which the tie bolts 214 extend and which secure this rear wall to these top and bottom plates. The casing also includes an inner vertical wall 215 in the form of a volute, this inner wall 215 being secured to the top and bottom plates 209, 211 by a sleeve 216 welded thereto and a tie bolt 217 extending through this sleeve and through the top and bottom plates 209, 211. This inner wall or volute 215 forms with the semicylindrical outer or rear wall 212, a passage 218 having an enlarged mouth 219 in line with the row of bean plants passing between the corresponding pair of gathering aprons 160. Each of these passages also has a discharge 220 which is directed angularly forwardly to deposit the tops of the bean plants between the row of beans being picked and in advance of the conveyor 61, the harvester passing over these tops without acting upon the same.

The vertical shaft 206 is supported by a bearing 221 in the top plate 209 of the casing 208 and by a bearing 222 in the bottom plate 211 of this casing. At the lower end of the shaft 206 is suitably secured a rotary cutter blade 223, this rotary cutter blade being shown as star-shaped and as having four cutting edges 224 which co-act with a stationary cutter blade 225 secured, as by screws 226, to the underside of the bottom plate 211 of the casing 208 at the rear of a mouth or recess 228 provided in this bottom plate 211 in line with the inlet mouth 219 of the space 218 between the outer semicylindrical wall 212 and inner volute 215 of the casing. A nut 229 removably secures each rotary knife 223 on its vertical shaft 206.

It will be seen that the bean plants entering the mouths 228 of the casings 208 encounter the stationary blades 225 and are cut by the cutting edges 224 of the rotating star-shaped knives 223 so that the bean plants are topped at an elevation determined by the elevation of the knives 223. This is determined by the adjustment of the elevation of the front end of the entire harvester frame as heretofore described.

It is necessary to propel the tops so severed from the bean plants through the passages 218 of each casing 208. To this end the inner wall or volute 215 of each casing is made up of vertically spaced sections 230, 231 and 233, best shown in Figures 3 and 4, to provide a pair of slots 234, 235 in this volute 215 extending completely therethrough. A star wheel 238 is arranged in each of these slots 234, 235, and is suitably secured at its center to the vertical shaft 206. As best shown in Figure 2, each of these star wheels has a plurality of arms 239 which traverse the passageway 218. Since the star wheels 238 are rotating with the rotary cutter blade 233, it will be seen that their arms 239 carry the severed tops of the bean plants through the passageway 218 and eject them through the discharges 220 into a windrow between the rows of beans being harvested.

To support the ends of the sections 230, 231 opposite from the tie bolt 217, each of these sections is connected by a plate to a bearing 241 which embraces the rotating shaft 206, as shown in Figure 4.

Each apron 160 is provided with a ground-engaging shoe or skid 245, best shown in Figures 3 and 10, which serves to support the apron and also permits it to follow the contour of the ground. Each skid 245 extends lengthwise of the apron and is provided with upturned front and rear ends. At its forward end, each of these shoes is jointedly connected with the pin 246 on which the front idler sprocket 182 of the corresponding gathering chain 181 is mounted. As shown in Figure 10, the pin 246 is provided at its lower end with a pair of downwardly projecting ears 248 between which is pivoted, as by a cross pin 249, the front end of a rearwardly projecting rod 250.

As shown in Figure 3, each rod 250 extends through a horizontal sleeve 251 fast to the forward end of the corresponding shoe 245. It will be seen that the forward end of each shoe 245 is free to pivot about its horizontal pivot pin 249 and also free to slide fore-and-aft along its rod 250. The rear of each shoe 245 is provided with a transverse pivot pin 252 to which an arm 253 is pivotally connected. On the rear end of the arm 253 is rigidly mounted an upstanding rod 254. The rod 254 slides in a vertical sleeve 255 at the forward end of a bracket 256 secured to the underside of the lower housing section 145 as shown in Figure 1. The upper end of each upstanding rod 254 is provided with a series of transverse holes 258 through which a retaining pin can be passed to limit the downward movement of the rod, each of these rods 254 and hence the rear end of each shoe 245 being free to move upwardly.

Power flow

The power flow from the power take-off 17 of the tractor T to the various rotating components of the harvester is as follows:

The shaft 18 of the power take-off (Figure 1) through the chain 27 drives the jack shaft 26 journalled in the elevator housing 25 forming part of the adjustable frame of the harvester. Through the sprocket 111, chain 110 and sprocket 109, this jack shaft drives the cross shaft 108. Through the two sets of miter gears 112 and 113 (Figure 2), the cross shaft 108 drives each of the picker shafts 114 which extend forwardly along opposite sides of the tractor. The picker shafts 114 rotate the picking mechanisms 120 so as to rotate the picking tines 130 in the directions indicated by the large arrows shown in Figure 12. Through the miter gears 199 and 198 in each of the gear cases 122 (Figure 7), the rotation of the picker shafts 114 rotates each of the short cross shafts 194. Through the sprockets 193 and chains 192, the shafts 194 drive the sprockets 191 (Figure 8) on each of the short cross shafts 178. Through the miter gears 188 and 186, each of the cross shafts 178 drives the corresponding pair of sprockets 183 which mesh with the corresponding gathering chains 181. One of these gathering chains 181 is associated with each of the four gathering aprons 160, the lower ends of these chains passing around the sprockets 182 (Figures 3 and 10), and the knobs 185 on these chains traveling upwardly and rearwardly along the opposite sides of these gathering aprons (Figures 2 and 3) to assist these gathering aprons in lifting the branches of the bean plants.

The rotation of the miter gear 198 (Figures 4 and 7) through the miter gear 200 drives the shaft 201, which in turn drives the sprocket 205 through the sprocket 203 and chain 204 (Figure 4). Through each ratchet clutch 207, each sprocket 205 drives the vertical shaft 206 journalled in the bearings 221, 241, and 222 of each of the casings 208. This rotates the multiblade rotary knives 223 at the bottom of each of these shafts 206, the sharpened arms 224 bringing the tops of the bean plants into engagement with the corresponding stationary cutter blade 225 so as to sever these tops from the plants. The severed tops are picked up by the arms or sweeps 239 (Figure 2) of the star wheels 238 and are propelled through the passages 218 to the outlets 220 and are deposited in a windrow between the two rows of beans being harvested in advance of the picking operation.

The rotation of the jack shaft 26, through the sprocket 59, chain 58 and sprocket 57 (Figure 1) drives the shaft 56 journalled in the top section 55 of the elevator. Within this section the shaft 56 carries sprockets (not shown) engaging the side chains 60 of the endless belt conveyor 61. The two drive chains of this conveyor 61 pass from these drive sprockets horizontally over a pair of idler sprockets 64; down the elevator housing 25 under a pair of idler sprockets 65 in the base 29 of the elevator; forwardly under and around the pair of idler sprockets 67 adjacent the prow 36; rearwardly under the pair of idler sprockets 66 in the base section 29 of the elevator; upwardly through the elevator housing 25 and over a pair of idler sprockets 63 in the top section 55 of the elevator; and thence back over the drive sprockets on the shaft 56.

The bean pods and trash deposited on the main stretch 61c of the conveyor 61 are carried upward by the elevating stretch 61b into engagement with the rear stretch of the idler belt 76 and thus drive this stretch of the idler belt upwardly. The idler belt 76 travels around the rollers 78 and 79.

The blower shaft 93 is driven by rotation of the jack shaft 26, through the pulley 95, belt 94 and pulley 92. The air from the outlet 90 of the blower is discharged against the stream of material leaving the discharge stretch 61a of the conveyor 61, and separates the trash from the bean pods.

Operation

The tractor T with the harvester forming the subject of the present invention attached thereto is propelled along the two rows of beans to be harvested, the centerlines of these rows being designated by the letter C. As best shown in Figure 2, the tractor T is guided so that these two rows of beans align with the spaces between the two pairs of gathering aprons 160 at each side of the harvester, which aprons are pivoted at their rear ends on the cross shafts 178 (Figures 3, 8 and 11) and are supported at their front ends by the ground-engaging shoes 245 (Figure 3). Referring to Figures 1 and 3, it will be seen that the upper parts 173 of each pair of these aprons curl outwardly away from the row of beans received therebetween and that these curving parts are arranged at a steep angle, sloping downwardly and forwardly toward the pointed ends of these aprons which travel close to the ground. Accordingly, these pointed forward ends of the aprons move close to the ground under the drooping branches of the bean plants, and as the aprons travel forwardly these branches are lifted so as to bring each bean plant to an erect position.

In order to hold the bean plants in such erect position while traveling rearwardly between the pairs of aprons 160, and to overcome the friction of these aprons in so lifting the branches of the bean plants, the pairs of gathering chains 181 are associated with these aprons, these chains being arranged at the angle indicated in Figure 3 and each having its operative stretch traveling in the guideway 170 (Figure 9) provided in each of these gathering aprons, each chain being provided with the knobs 185 which project from the face of the apron along which the bean plants travel so as to interengage with the bean plants and positively propel them along the aprons. These operative stretches of the gathering chains 181 travel upwardly and rearwardly and are synchronized with the rate of travel of the tractor so as, in effect, to remain stationary and not pull the bean plants from the ground nor retard their progress along the gathering aprons 160.

While thus held between the gathering chains 181, the plants of each row of beans are presented to the corresponding rotary knife 223, and the sharpened edges 224 thereof coact with the stationary blade 225 to cut off the tops of the bean plants.

After leaving the cutting blades 223, the gathering chains 181 continue to hold the bean plants during their rearward movement between the corresponding pair of gathering aprons 160, and deliver the bean plants under the forward stationary end disk 123 of the corresponding picking mechanism 120 and into the space (Figure 12) between the lower rounded edge 150 of the corresponding housing plate 145 and the adjacent mold board 151. On moving into this space, the bean plants enter the zone of action of the picking tines 130, which are rotating about the axis of the corresponding picker shaft 114 in the direction of the arrows associated with Figure 12. With such movement of the picking tines 130, it will be seen that the bean plants, while being picked, are bent laterally over the mold board 151. This lateral bending is assisted by the comb-like grill formed by the slats 139, which grill also serves to clean trash from the picking tines 130 as above described. Due to the shape and location of the mold board, the point of bending of each bean plant progresses downwardly along the bean plant as the harvester advances, the longitudinal edge of the mold board between its vertical face 152 and its concave face 154 serving as a fulcrum during this bending. This lateral bending is an important feature of the invention, since bean plants are not deeply rooted and can be pulled from the ground with relative ease. The picking tines 130 exert a substantial force against the bean plants and would tend to uproot the bean plants were it not for the fact that their tendency to lift the bean plans is counteracted by the bean plants being bent over the mold boards 151.

The picking tines 130 move upward within the bean plants, strike the stems which connect the pods with the bean plants, and operate to sever the bean pods and fling them onto the upper surface of the main stretch 61c of the conveyor 61, which serves both of the picking mechanisms 120. In the event that a picking tine 130 encounters excessive resistance in so combing the bean plants, the picking tines are capable of yielding due to their spring mounting, as above described. The bean pods, together with the leaves and other material necessarily separated from the bean plants, are carried by the main stretch 61c of conveyor 61 to the elevator stretch 61b, and thence to the windrowing and bagging mechanisms above described.

At different times and with different types of bean plants, it is necessary to adjust the front end of the harvester frame so as to top the bean plants at the desired height. To effect such adjustment, the operator moves the hydraulic control lever L' (Figure 1) to swing the levers 14 in one direction or the other. On swinging clockwise, as viewed in Figure 1, these levers 14, through the push rods 50, operate to swing the triangular plates 45 clockwise about their pivots 46 and, through the links 44, to lift the front end of the harvester frame.

It is also desirable to be able to adjust the rear end of the harvester frame so as to adjust the height of the rear ends of the picking mechanisms 120 and thereby determine the lowermost level at which the bean plants will be picked. Bean plants mature from the bottom up, and by suitable rear elevation, old, over-ripe bean pods at the bottoms of the plants can be missed and left on the bean plants if desired. To effect such adjustment, the operator moves the hydraulic control lever L (Figure 1) to swing the levers 13 in one direction or the other. On swinging clockwise, as viewed in Figure 1, the levers 13, through the chains 21, swing the bell crank levers 19 clockwise and thereby elevate the rear end of the harvester frame.

The front and rear ends of the harvester are therefore independently adjustable as to elevation.

The details of operation of other parts of my harvester and the advantages thereof, are believed to be sufficiently clear from the foregoing description and the drawings.

From the foregoing it will be seen that the present invention provides a sturdy and reliable harvester for snap beans which obtains a high yield with minimum injury to the beans and with minimum difficulties in leaf separation. It will further be seen that the present invention accomplishes the many objects and has the many advantages heretofore enumerated.

Although I have thus described my invention in the best form of which I am aware, it will be evident to those skilled in this art that changes and modifications could be made without departing from the spirit of my invention. I desire to be limited, therefore, only by the scope of the appended claims.

I claim:

1. A snap bean picker of the type having a picking mechanism including longitudinally spaced picking tines adapted to move upward within the bean plants to sever the pods therefrom, characterized by the provision of a mold board having a longitudinally extending, inwardly and upwardly inclined surface adjacent to and cooperating with the picking mechanism to lay the bean plants on their sides laterally of the mold board during the picking operation over a longitudinal edge of said inclined surface as a fulcrum.

2. A snap bean picker of the type having a picking mechanism including longitudinally spaced picking tines adapted to move upward within the bean plants to sever the pods therefrom, the picking mechanism being arranged to comb the bean plants progressively from the top down as the picker advances along a row of bean plants, characterized by the provision of a mold board having a longitudinally extending, inwardly and upwardly inclined surface adjacent to and cooperating with the picking mechanism to lay the bean plants on their sides laterally of the mold board during the picking operation over a longitudinal edge of said inclined surface as a fulcrum, said fulcrum edge being inclined upward and forward so that each bean plant is bent over and frictionally held at progressively descending points adjacent the portion of the bean plant being operated on by the picking tines as the picker advances.

3. A snap bean picker of the type having a picking mechanism including a rotary reel carrying longitudinally spaced picking tines adapted to move upward within the bean plants to sever the pods therefrom, the reel being inclined upward and forward to comb the bean plants progressively from the top down as the picker advances along a row of bean plants, characterized by the provision of a mold board having a longitudinally extending, inwardly and upwardly inclined surface adjacent to and cooperating with the picking mechanism to lay the bean plants on their sides laterally of the mold board during the picking operation over a longitudinal edge of the said inclined surface as a fulcrum, said fulcrum edge being inclined upward and forward so that each bean plant is bent over and frictionally held at progressively descending points adjacent the portion of the bean plant being operated on by the picking tines as the picker advances, and the inclined surface being upwardly concave immediately above the fulcrum edge in substantial conformity with the sweep of the ends of the picking tines.

4. A snap bean picker as claimed in claim 1, characterized further by spaced gathering aprons located in front of the picking mechanism and forming a row space for receiving the bean plants and raising them to an erect position, and by means located adjacent the gathering aprons for cutting off the tops of the bean plants and depositing them in a windrow alongside the gathering aprons in advance of the picking mechanism.

5. A snap bean picker of the type having a picking mechanism including longitudinally spaced picking tines adapted to move upward within the bean plants to sever the pods therefrom, the picking mechanism being arranged to comb the bean plants progressively from the top down as the picker advances along a row of bean plants, comprising in combination, spaced gathering aprons located in front of the picking mechanism and forming a row space for receiving the bean plants and raising them to an erect position, a mold board adjacent to the picking mechanism and forming therewith a longitudinal space aligned with and adapted to receive the bean plants leaving the row space between the gathering aprons, the picking mechanism and the mold board being on opposite sides of said longitudinal space and the mold board having a longitudinally extending, inwardly and upwardly inclined surface cooperating with the picking mechanism to lay the bean plants on their sides laterally of the mold board during the picking operation over a longitudinal edge of said inclined surface as a fulcrum, said fulcrum edge being inclined upward and forward so that each bean plant is bent over and frictionally held at progressively descending points adjacent the portion of the bean plant being operated on by the picking tines as the picker advances, and collecting means located beyond the mold board at the same side of said longitudinal space for receiving the bean pods severed from the plants by the picking tines.

6. A snap bean picker as claimed in claim 1, in which the picking mechanism includes a rotary reel carrying the picking tines, and in which said inclined surface is upwardly concave immediately above its fulcrum edge in substantial conformity with the sweep of the ends of the picking tines.

7. A snap bean picker of the type having a picking mechanism including longitudinally spaced picking tines adapted to move upward within the bean plants to sever the pods therefrom, the picking mechanism being arranged to comb the bean plants progressively from the top down as the picker advances along a row of bean plants, comprising in combination, spaced gathering aprons located in front of the picking mechanism and forming a row space for receiving the bean plants and raising them to an erect position, cutting means located adjacent the gathering aprons for topping the bean plants, means for depositing the tops in a windrow alongside the gathering aprons in advance of the picking mechanism, a mold board substantially parallel with the picking mechanism and forming therewith a longitudinal space aligned with and adapted to receive the bean plants leaving the row space between the gathering aprons, the picking mechanism and the mold board being on opposite sides of said longitudinal space and the mold board having a longitudinally extending, inwardly and upwardly inclined surface cooperating with the picking mechanism to lay the bean plants on their sides laterally of the mold board during the picking operation over a longitudinal edge of said inclined surface as a fulcrum, said fulcrum edge being inclined upward and forward so that each bean plant is bent over and frictionally held at progressively descending points adjacent the portion of the bean plant being operated on by the picking tines as the picker advances, and collecting means located beyond the mold board at the same side of said longitudinal space for receiving the bean pods severed from the plants by the picking tines.

8. A snap bean picker as claimed in claim 7, in which the picking mechanism includes a rotary reel carrying the picking tines, and in which said inclined surface is upwardly concave immediately above its fulcrum edge in conformity with the sweep of the ends of the picking tines.

9. A snap bean picker as claimed in claim 8, in which the picking mechanism is provided with a stationary slotted grill spirally arranged with respect to the axis of the reel so that the picking tines project fully through the slots of the grill near the beginning of the working portion of their travel and withdraw behind the grill through the slots near the end thereof.

10. A snap bean picker as claimed in claim 8, in which the picking tines are pivotally mounted on the reel for rotation about an axis substantially parallel to the axis of the reel, stops are provided to limit the rotation of the tines in the direction of rotation of the reel and to establish normal working positions of the tines, and resilient means are provided to bias the tines against the stops.

11. A snap bean picker of the type having a picking mechanism including longitudinally spaced picking tines adapted to move upward within the bean plants to sever the pods therefrom, the bean picker having two such picking mechanisms and being adapted to pick two rows of beans plants simultaneously and comprising in combination, two pairs of spaced gathering aprons located in front of the picking mechanisms and forming two row spaces for receiving the bean plants and raising them to an erect position, two mold boards adjacent one to each picking mechanism and forming therewith a longitudinal space aligned with and adapted to receive the bean plants leaving the row space between each pair of gathering aprons, each picking mechanism being located at the outside of one of said two longitudinal spaces and each mold board being located at the inside of one of said two longitudinal spaces, each mold board having a longitudinally extending, inwardly and upwardly inclined surface cooperating with its associated picking mechanism to lay the bean plants on their sides laterally toward the center line between the two mold boards during the picking operation over a longitudinal edge of the inclined surface as a fulcrum, and collecting means located between the mold boards and serving both picking mechanisms for receiving the bean pods severed from the plants by the picking tines.

12. A snap bean picker as claimed in claim 11, having cutting means located adjacent each pair of gathering aprons for topping the bean plants, and means for depositing the tops in a windrow between the two pairs of gathering aprons in advance of the collecting means.

13. A snap bean picker of the type having a picking mechanism including longitudinally spaced picking tines adapted to move upward within the bean plants to sever the pods therefrom, the picking mechanism being arranged to comb the bean plants progressively from the top down as the picker advances along a row of bean plants, the bean picker having two such picking mechanisms and being adapted to pick two rows of bean plants simultaneously and comprising in combination, two pairs of spaced gathering aprons located in front of the picking mechanisms and forming two row spaces for receiving the bean plants and raising them to an erect position, two mold boards adjacent one to each picking mechanism and forming therewith a longitudinal space aligned with and adapted to receive the bean plants leaving the row space between each pair of gathering aprons, each picking mechanism being located at the outside of one of said two longitudinal spaces and each mold board being located at the inside of one of said two longitudinal spaces, each mold board having a longitudinally extending, inwardly and upwardly inclined surface cooperating with its associated picking mechanism to lay the bean plants on their sides laterally toward the center line between the two mold boards during the picking operation over a longitudinal edge of the inclined surface as a fulcrum, the fulcrum edge of each mold board being inclined upward and forward so that each bean plant is bent over and frictionally held at progressively descending points adjacent the portion of the bean plant being operated on as the picker advances, and collecting means located between the mold boards and serving both picking mechanisms for receiving the bean pods severed from the plants by the picking tines.

14. A snap bean picker as claimed in claim 13, having cutting means located adjacent each pair of gathering aprons for topping the bean plants, and means for depositing the tops in a windrow between the two pairs of gathering aprons in advance of the collecting means.

15. In a snap bean picker of the character described, a picking mechanism comprising in combination, a rotatable picker shaft, a reel secured to the shaft, a plurality of longitudinally spaced picking tines mounted on the reel, and a stationary slotted grill spirally arranged with respect to the axis of the reel so that the picking tines project fully through the slots of the grill near the beginning of the working portion of their travel and withdraw behind the grill through the slots near the end thereof.

16. The combination as claimed in claim 15, in which the picking tines are pivotally mounted on the reel for rotation about an axis substantially parallel to the axis of the reel, stops are provided to limit the rotation of the tines in the direction of rotation of the reel and to establish normal working positions of the tines, and resilient means are provided to bias the tines against the stops.

17. In a snap bean picker of the character described, mechanism for gathering the bean plants and presenting them in an erect position to a picking mechanism, comprising in combination, a pair of spaced gathering aprons located in front of the picking mechanism and forming a row space for receiving a row of bean plants, each gathering apron having a pointed front end and extending upward and rearward therefrom to an upper part flaring away from the bean plants to lift the drooping branches of the bean plants to an erect position while passing the plants, means for pivotally supporting the rear ends of the gathering aprons on the frame of the bean picker, ground-engaging shoes supporting the front ends of the gathering aprons, whereby the gathering aprons may follow the contour of the ground, an endless chain on each gathering apron having a stretch disposed between the apron and the bean plants and arranged upward and rearward, the chain having projections adapted to engage the bean plants, and means for driving the chain at a speed proportional to the forward speed of the bean picker so that the projections remain substantially stationary with respect to the bean plants.

18. In a snap bean picker of the character described, mechanism for gathering and topping the bean plants and presenting them in an erect position to a picking mechanism, comprising in combination, a pair of gathering aprons located in front of the picking mechanism at either side of a row of bean plants for raising the bean plants to an erect position, a stationary substantially horizontal cutter blade adjacent the gathering aprons, a substantially vertical cutter shaft, a rotary cutter blade mounted on the shaft and cooperating with the stationary blade to cut off the tops of the bean plants, and a sweep arm mounted on the cutter shaft above the rotary cutter blade and serving to throw the severed tops alongside the row.

19. The combination as claimed in claim 18, in which a stationary casing surrounds the sweep arm and forms a passage having a forwardly directed outlet serving to guide the severed tops and deposit them in a windrow alongside the row in advance of the picking mechanism.

References Cited in the file of this patent

UNITED STATES PATENTS

| Number | Name | Date |
| --- | --- | --- |
| 924,552 | Holmes | June 8, 1909 |
| 1,000,976 | Arnold | Aug. 22, 1911 |
| 1,116,107 | Pallady | Nov. 3, 1914 |
| 1,429,168 | Scott | Sept. 12, 1922 |
| 1,859,980 | Mueller | May 24, 1932 |
| 1,926,388 | Jones | Sept. 12, 1933 |
| 2,134,867 | Fergason | Nov. 1, 1938 |
| 2,466,089 | Esch | Apr. 5, 1949 |